Jan. 29, 1952  J. MOON  2,583,958
PORTABLE DERRICK
Filed Aug. 20, 1946  4 Sheets-Sheet 1
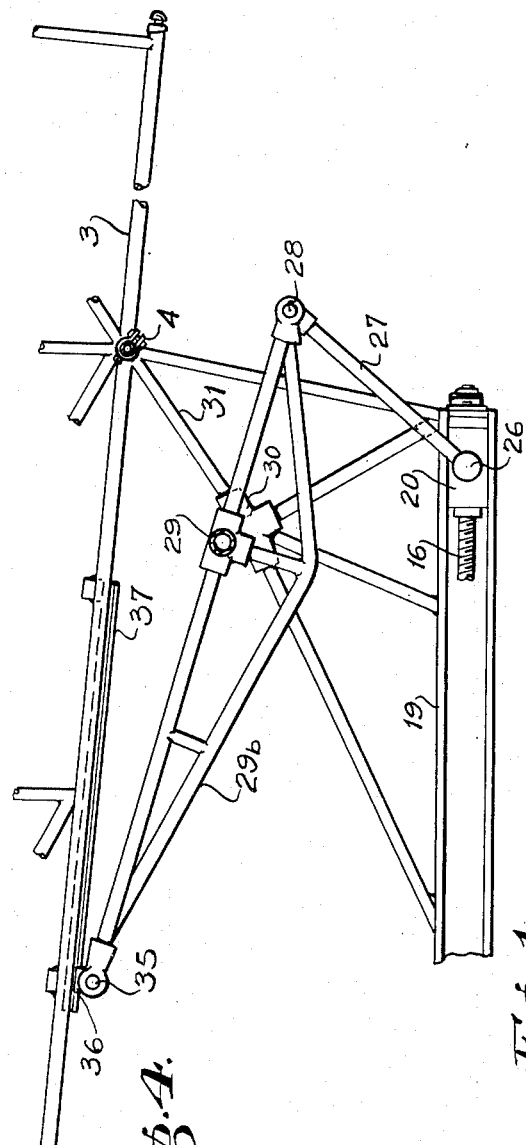
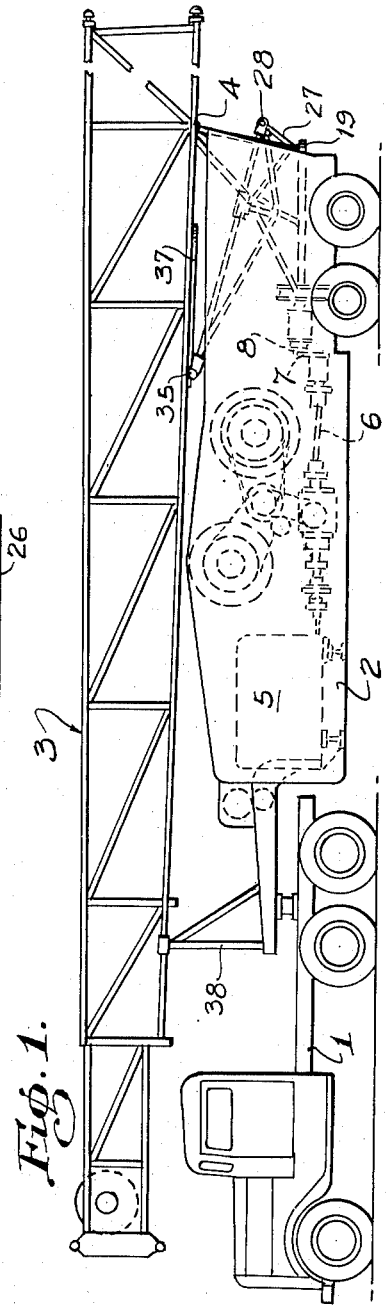
INVENTOR.
JAMES MOON
BY
*Philip Subkow*
ATTORNEY.

Jan. 29, 1952 J. MOON 2,583,958
PORTABLE DERRICK
Filed Aug. 20, 1946 4 Sheets-Sheet 2
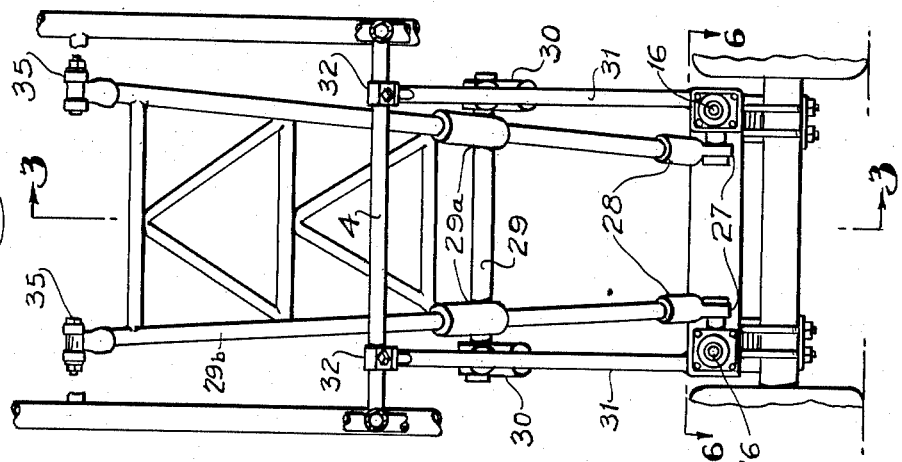
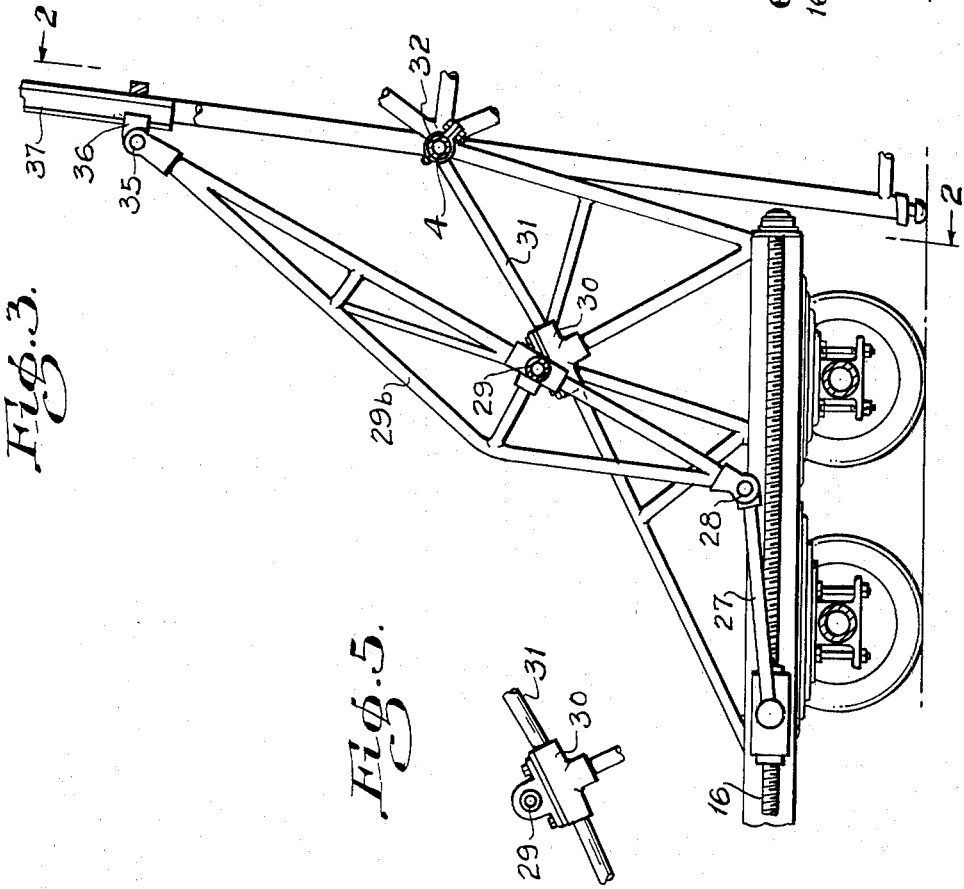
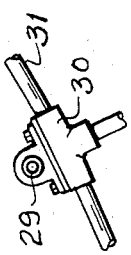
INVENTOR.
JAMES MOON
BY
ATTORNEY.

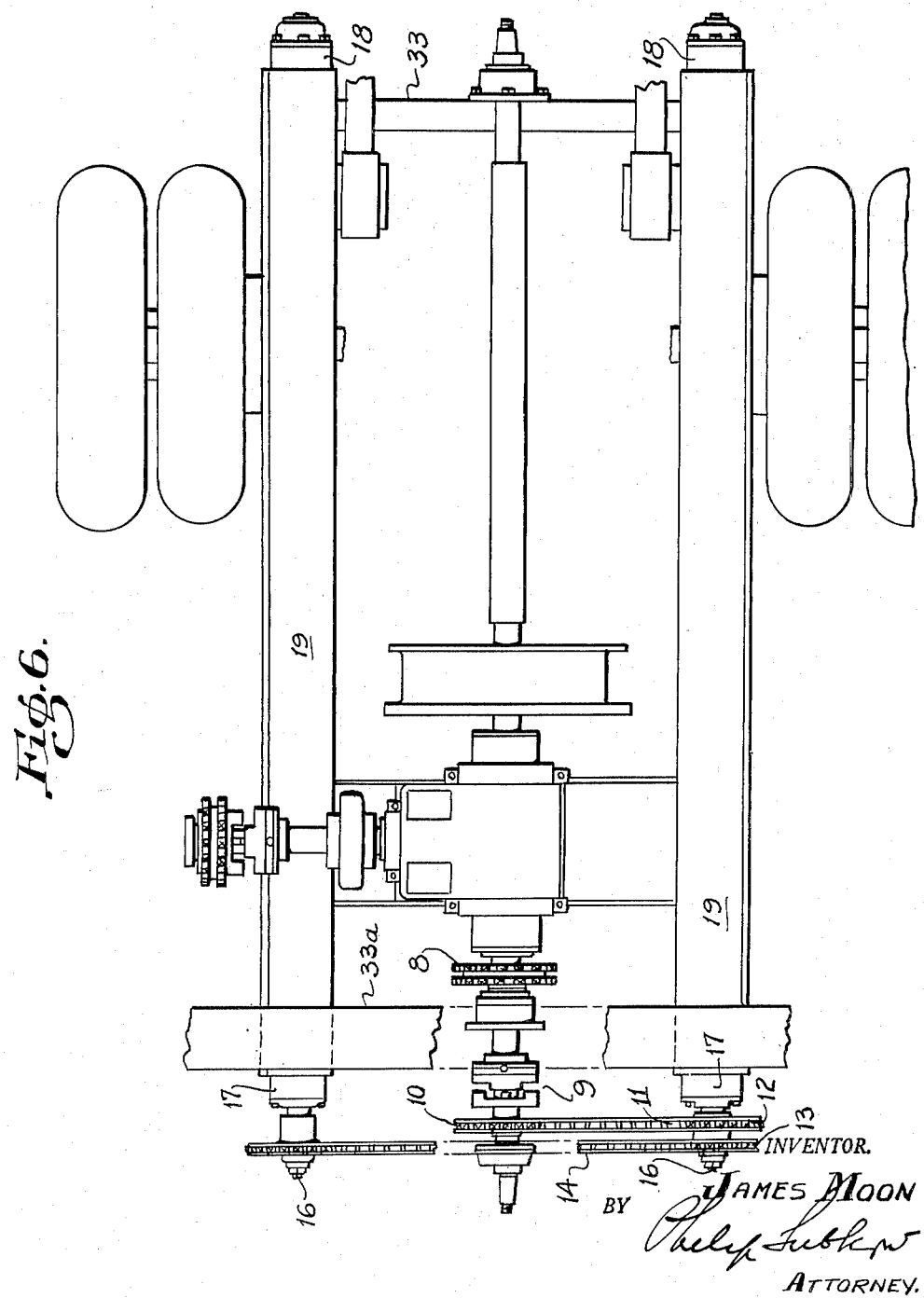

Jan. 29, 1952   J. MOON   2,583,958
PORTABLE DERRICK
Filed Aug. 20, 1946   4 Sheets-Sheet 4
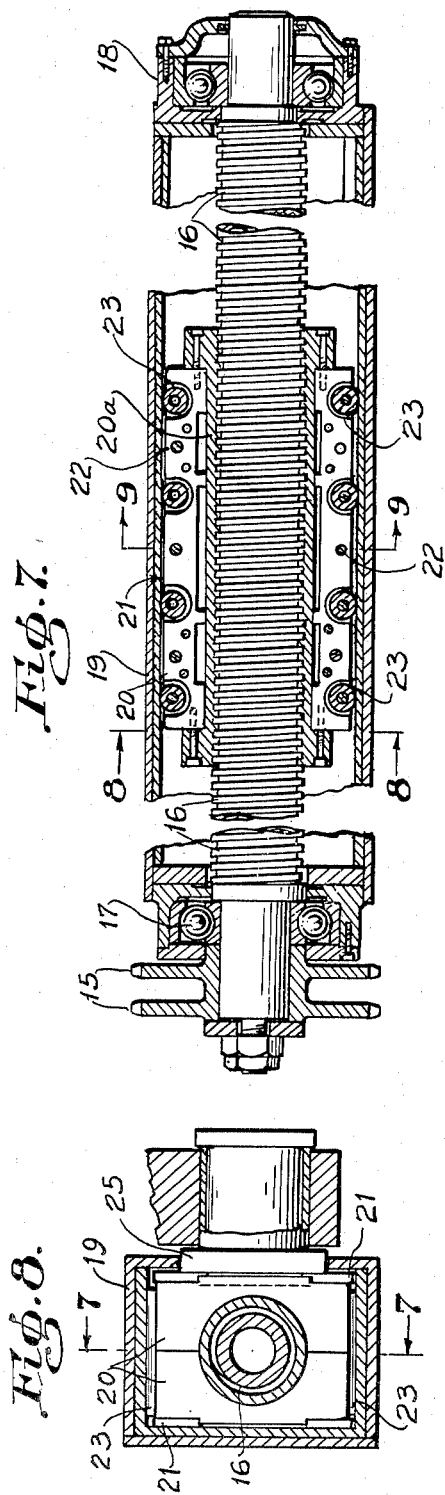
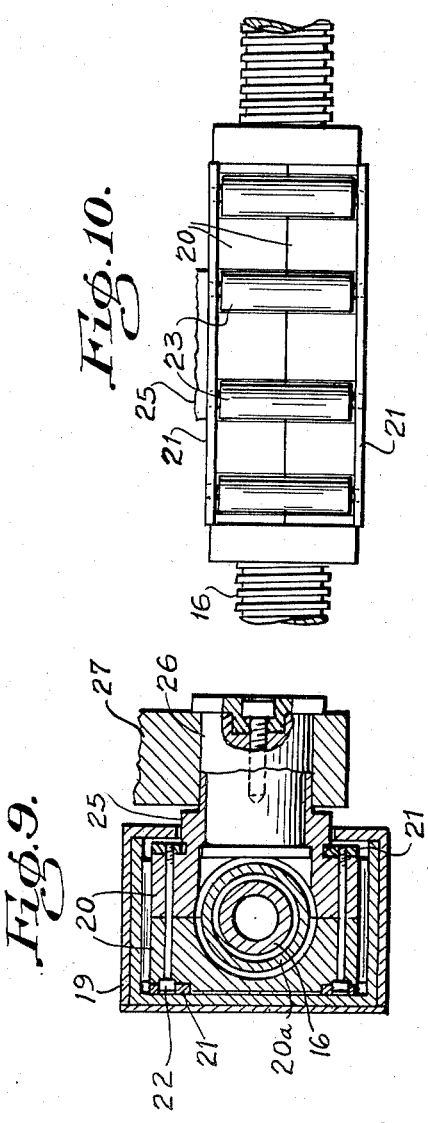
INVENTOR.
JAMES MOON
BY
ATTORNEY.

Patented Jan. 29, 1952

2,583,958

UNITED STATES PATENT OFFICE 2,583,958

PORTABLE DERRICK

James Moon, Altadena, Calif., assignor to Western Oil Tool & Engineering Co. Inc., Glendale, Calif., a corporation of California Application August 20, 1946, Serial No. 691,717

3 Claims. (Cl. 189—11)

1

This invention relates to an improved design and construction for portable derricks or masts, and particularly to the mounting of such derricks or masts upon a truck, trailer, or other vehicle.

This invention and its objects will be further described in connection with the accompanying drawings, in which Fig. 1 is a somewhat schematic side elevation of a truck and trailer showing the mounting of a derrick employed in drilling of oil wells according to the present invention;

Fig. 2 is a fragmentary end view and fragmentary section showing the raising mechanism with the derrick in the erected position which section is taken on line 2—2 of Fig. 3;

Fig. 3 is a fragmentary section taken on line 3—3 of Fig. 2 with parts of the screw box guide section omitted for clearer illustration of parts;

Fig. 4 is a view similar to Fig. 3 but showing the elevating mechanism and the derrick in the lowered position;

Fig. 5 is a detail of the pivot shaft bearing mounting;

Fig. 6 is a fragmentary section taken on the line 6—6 of Fig. 2 with parts omitted for greater clarity;

Fig. 7 is a section of the screw nut and crosshead mechanism taken on line 7—7 of Fig. 8;

Fig. 8 is a section taken on line 8—8 of Fig. 7;

Fig. 9 is a section taken on line 9—9 of Fig. 7;

Fig. 10 is a top view of the nut and screw with the guide box section of the chassis removed.

The truck 1 and trailer 2 bearing the usual drilling and oil-well servicing equipment carry a telescoping derrick 3 which is mounted on the trailer upon a hinge 4, around which hinge, as a pivot, the derrick is rotated to elevate or retract it onto the trailer. The power for this movement of the derrick, as shown in the particular form illustrated on the drawing, is via a motor 5 and power shafting 6, chain 7, sprocket 8, and clutch 9. This power is transmitted through two screws 16 driven by the sprocket and chain drives 10, 11, 12, 13, 14, and 15.

The screws rotate in bearings 17 and 18 at the end of a box guide section 19 which forms part of the main longitudinal frame members of the chassis of the trailer. The end cross member 33, the main transverse box member 33a tie in with the box 19, and together with other conventional bracing and tie members, and longitudinal members, not shown, make up the chassis frame of the trailer.

A split housing 20, holding a nut 20a operating

2 on the screw 16, which housing is held by bronze bearing plates 21, by means of screws 22, carries roller 23, operating in semi-cylindrical recesses in the nut top face. The boss 25 formed integrally with one-half of the housing projects through a slot in the box member 19 and carries a pivot shaft 26 on which is pivotally mounted the lever 27 having an end bearing in which the pivot shaft 26 is mounted so that the lever bearings may rotate about the pivot shaft 26.

The lever 27 is pivotally connected at 28 to the truss 29b. The truss 31 mounted on the box member 19 carries bearings 30 through which a shaft 29 passes. The shaft 29 passes through bearings 29a on truss 29b.

At the end of truss 31 are bearings 32 through which the shaft 4 passes. This shaft is the main pivot shaft on which the derrick is pivoted and may form one of the cross braces of the derrick by connection to the legs of the derrick closest to the trailer.

The truss 29b is pivotally connected to a slide 36 by means of pivot pins 35. The slide 36 travels in slide guides or tracks 37, one slide mounted on each of two tracks spaced and mounted on cross braces between the rear legs of the derrick. A rest 38 is provided on the bed of the trailer.

The operation of the lifting mechanism for elevating and lowering the derrick will be apparent from the above description. On engagement of the clutch 9 the rotation of the sprocket 8 transmitted through the chain and sprocket drives 10, 11, 12, 13, 14, anad 15 simultaneously rotates the screws 16, causing the nut and housing to move toward the left in the guide formed by the box member 19, from the position shown in Figs. 1 and 4 to the position shown in Figs. 2 and 3. On such motion the lever 27 rotates the truss 29b around the pivot shaft 29 and the slide 36 moves down the guide 37, elevating the derrick by pivoting the derrick on pivot shaft 4. It will be noted that the screw can travel only within the box section of the longitudinal chassis frame member 19.

As will be observed, the greatest load occurs when the derrick is started in its elevating movement, since the moment about the pivot shaft 4 is greatest at low angles. At the same time the lever arm of the truss 29b around the pivot shaft 4 is greatest. As the derrick is elevated, the moment of the derrick load about shaft 4 decreases and the effective lever arm of the elevating truss 29b around shaft 29 decreases.

By positioning the screw within the box 19 which forms the main chassis frame and by moving the nut within the box section, the bending loads on the screw are taken up in the main trailer chassis members which are thus adequately trussed by the chassis cross members to take up the load. This is aided by the fact that the hinge point 4 is positioned aft of the elevating screw and elevating mechanism so that the resultant vertical loads are transmitted via the truss 31 to the trussed chassis members, and this avoids the necessity of providing cantilevered extension members which protrude beyond the end of the trailer. This also permits concentrating the load so that it is distributed ahead of the hinge point and over the trailer chassis. This is important in view of legal road requirements of various States.

Another advantage of the design arising from the elevating screws being within the chassis frame is that the area aft of the trailer and from the trailer bed to the ground contains no protruding mechanism. In fact, the lever 27 and hinge 28 in the down position of the derrick are only a few inches and usually less than one foot aft of the hinge point 4 and in some sizes behind the hinge point 4. This free area permits the truck to be backed up to the well site without interfering with any of the facilities or installations necessary to receive the portable equipment.

While I have described a particular embodiment of my invention for the purpose of illustration, it should be understood that various modifications and adaptations thereof may be made within the spirit of the invention as set forth in the appended claims.

I claim:

1. A portable derrick, comprising a vehicle, a chassis for said vehicle, said chassis comprising main longitudinal frame members and end cross members, a pivot shaft mounted on said chassis, a derrick, said derrick being pivotally mounted on said pivot shaft, a slide guide on said derrick, a slide slidably mounted on said slide guide, an elevating truss pivotally connected to said slide, a second pivot shaft mounted on said chassis intermediate the ends of said longitudinal frame members, said elevating truss being pivotally mounted on said second pivot shaft, means for pivoting said elevating truss on its pivot shaft, including a screw mounted in the said chassis, a nut mounted for travel on said screw entirely within said chassis between the ends of said longitudinal frame members, and a link connection between said screw and said elevating truss.

2. A portable derrick, comprising a vehicle, a chassis, main longitudinal chassis frame members formed with a box section, cross end members, and brace members for said chassis, a pivot shaft mounted on said chassis, a derrick, said derrick being pivotally mounted on said pivot shaft, a slide guide on said derrick, a slide slidably mounted on said slide guide, an elevating truss pivotally connected to said slide, a second pivot shaft mounted on said chassis intermediate the ends of said longitudinal frame members, said elevating truss being pivotally mounted on said second pivot shaft, a screw mounted in said longitudinal chassis frame member, a bearing for said screw in said chassis frame member, a slot in said frame member, a nut mounted on said screw for travel in the box of said longitudinal frame member, a pivot shaft connected to said nut and protruding through said slot and limited to travel only in said box of said longitudinal end member, a link pivotally mounted on said last-named pivot shaft, said link being pivotally mounted on said elevating truss.

3. A portable derrick, comprising a vehicle, a chassis for said vehicle, main longitudinal chassis frame members formed with a box section and cross end members for said chassis, a truss mounted on said longitudinal frame members, a derrick pivotally mounted on said truss, a slide guide on said derrick, a slide in said slide guide, an elevating truss pivotally connected to said slide, a pivot shaft on said first-mentioned truss positioned intermediate the ends of said longitudinal chassis frame members, said elevating truss being pivotaly mounted on said pivot shaft, a screw mounted in said longitudinal chassis frame member, a slot in said frame member, a bearing for said screw in said chassis frame member, a nut mounted on said screw for travel in the box of said longitudinal frame member, a pivot shaft connected to said nut and protruding through said slot and limited to travel only in said box of said longitudinal end member and a link pivotally mounted on said last-named pivot shaft, said link being pivotally mounted on said elevating truss.

JAMES MOON.

REFERENCES CITED

The following references are of record in the file of this patent:

UNITED STATES PATENTS

| Number | Name | Date |
|---|---|---|
| 798,566 | Carroll | Aug. 29, 1905 |
| 986,352 | Briggs | Mar. 7, 1911 |
| 1,575,801 | Stiefel | Mar. 9, 1926 |
| 1,577,989 | Sieber | Mar. 23, 1926 |
| 2,204,713 | White, Jr. | June 18, 1940 |
| 2,204,716 | Woody | June 18, 1940 |
| 2,354,922 | McEwen et al. | Aug. 1, 1944 |